United States Patent [19]

Suematsu

[11] 4,351,297

[45] Sep. 28, 1982

[54] METHOD AND APPARATUS FOR CONTROLLING THE IGNITION TIMING OF AN INTERNAL COMBUSTION ENGINE

[75] Inventor: Toshio Suematsu, Toyota, Japan

[73] Assignee: Toyota Jidosha Kogyo Kabushiki Kaisha, Toyota, Japan

[21] Appl. No.: 207,085

[22] Filed: Nov. 14, 1980

[30] Foreign Application Priority Data

Nov. 15, 1979 [JP] Japan ............................ 54/147013

[51] Int. Cl.³ ............................................. F02P 5/04
[52] U.S. Cl. ..................................... 123/421; 123/424
[58] Field of Search ............................ 123/424, 421

[56] References Cited

U.S. PATENT DOCUMENTS

| 3,793,833 | 2/1974 | van Basshuysen | 123/424 |
| 4,096,843 | 6/1978 | Marsee | 123/424 |
| 4,104,998 | 8/1978 | Fenn | 123/421 |

Primary Examiner—Ronald B. Cox
Attorney, Agent, or Firm—Kenyon & Kenyon

[57] ABSTRACT

An apparatus and method for correcting the ignition timing of an engine after cold startup, in which a spark retard correction value is gradually reduced to zero over a period of time irrespective of the coolant temperature of the engine, after the coolant temperature exceeds a predetermined value. As a result, the emission of noxious components in the exhaust gases can be effectively reduced when the engine is started from the cold condition.

8 Claims, 9 Drawing Figures

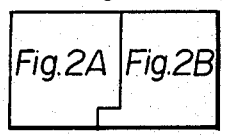
Fig. 2
Fig. 2A
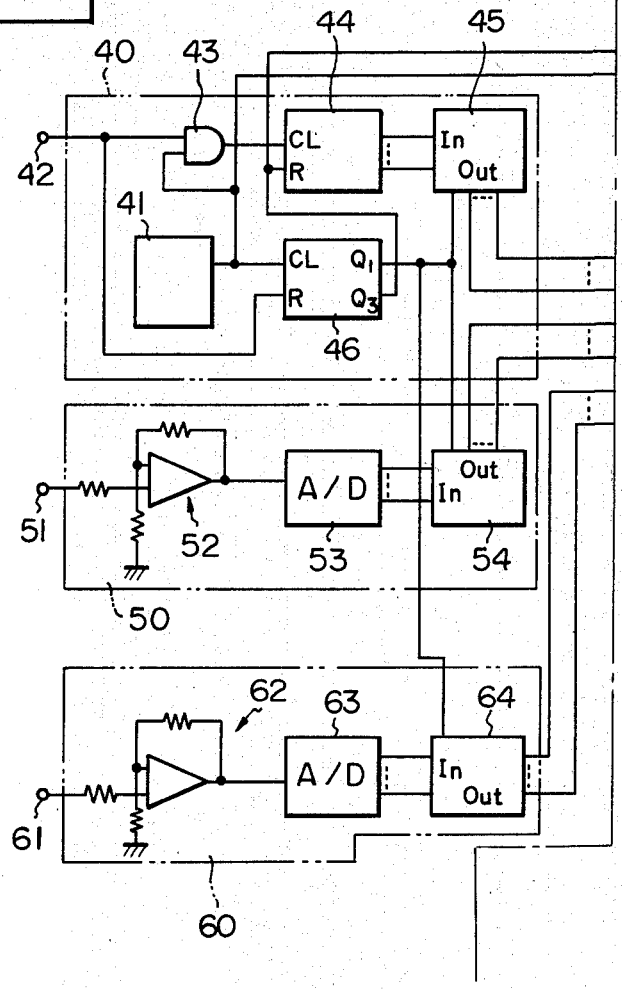

METHOD AND APPARATUS FOR CONTROLLING THE IGNITION TIMING OF AN INTERNAL COMBUSTION ENGINE

BACKGROUND OF THE INVENTION

The present invention relates to a method of controlling the ignition timing of an internal combustion engine, and more specifically to a method of controlling the ignition timing until the engine is completely warmed-up.

In general, ignition timing of internal combustion engines are retarded until the temperature of the coolant reaches a predetermined value, in order to purify the exhaust gases while the engines are cold. As a result, maximum combustion temperature and thus emission of NOx components decrease; further, the temperature of the exhaust gases increases so that the oxidation of HC components is promoted and the emission thereof is reduced. When the temperature of the coolant reaches a predetermined value, the control for retarding the ignition angle is stopped; the ignition timing is controlled in an ordinary manner, and harmful components are removed by a catalytic converter.

However, the above-mentioned conventional method controls the ignition timing simply relying upon the temperature of the coolant. Therefore, when the engine is started under cold conditions, and even when the control for retarding the ignition is maintained until the temperature of the coolant has reached a predetermined value, the catalytic converter is often not sufficiently warmed-up to its active temperature. In such a case, it is impossible to effectively remove harmful components, especially NOx and HC components that are contained in the exhaust gases.

SUMMARY OF THE INVENTION

It is, therefore, an object of the present invention to provide a method of controlling the ignition timing whereby the exhaust gases can be effectively purified even when the engine is started from a cold condition.

According to the present invention, an ignition timing control method comprises the steps of: detecting the coolant temperature of the engine and producing an electrical signal being indicative of the detected coolant temperature; calculating the ignition timing correction value from the produced temperature signal by using a function describing a desired relationship between the coolant temperature and the ignition timing correction value only when the detected coolant temperature is lower than or equal to a predetermined temperature which is lower than a coolant temperature of the completely warmed-up engine; after the detected coolant temperature exceeds the predetermined value, reducing, in response to a lapse of time, the ignition timing correction value from the value calculated by the above-calculating step when the detected coolant temperature is equal to the predetermined value; and retarding the ignition timing of the engine in accordance with the ignition timing correction value.

The above and other related objects and features of the present invention will be apparent from the description of the present invention set forth below, with reference to the accompanying drawings, as well as from the appended claims.

BRIEF DESCRIPTION OF THE DRAWINGS

FIG. 2A and FIG. 2B taken together as shown in FIG. 2 is a detailed block diagram of a part of the system illustrated in FIG. 1;

DETAILED DESCRIPTION OF THE PREFERRED EMBODIMENT

Figure 1:
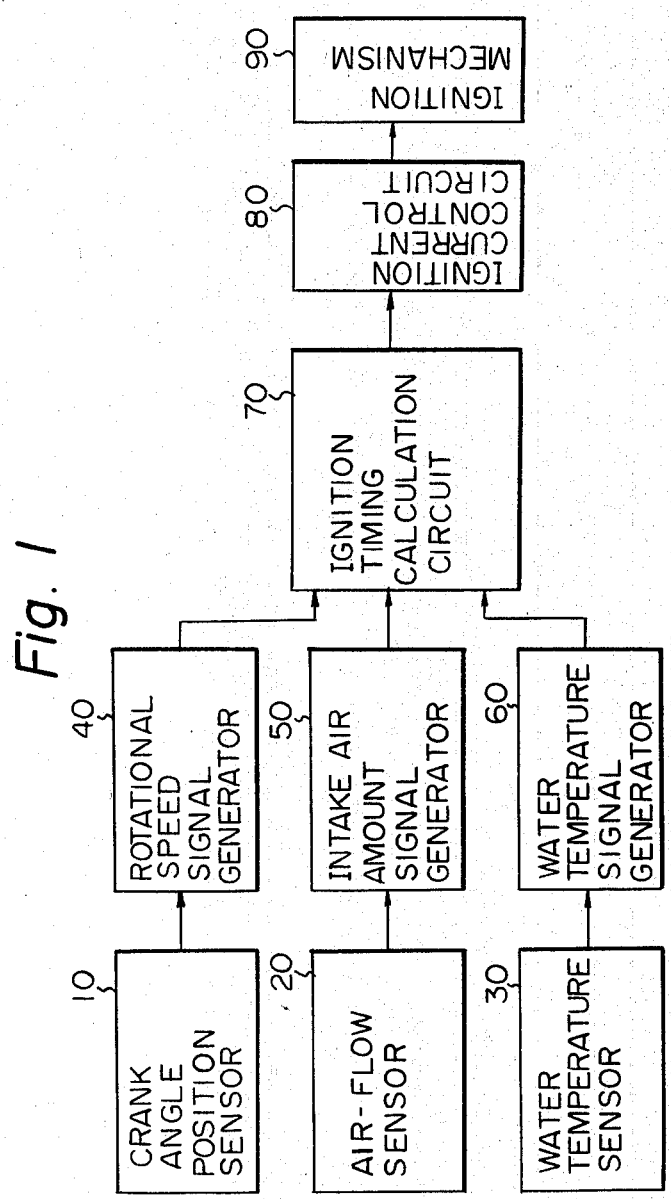
FIG. 1 is a schematic block diagram of an ignition control system according to the present invention.

Referring to FIG. 1, which is a block diagram schematically illustrating an embodiment of the present invention, reference numeral 10 denotes a crank angle position sensor which is attached to a distributor shaft of a six-cylinder four-cycle internal combustion engine. The sensor 10 produces six reference signals which have a pulse width corresponding to a predetermined crank angle $\theta_1$ at every predetermined reference crank angle position per one revolution of the distributor shaft, 20 denotes an air-flow sensor which detects the rate of the intake air sucked into the engine, and 30 denotes a water-temperature sensor which detects the temperature of the coolant in the engine. Reference signals produced by the sensor 10 are applied to a rotational speed signal generator circuit 40 which forms digital signals that represent the running speed of the engine, and the speed signals are applied to an ignition timing calculation circuit 70. Outputs of the air-flow sensor 20 and the water-temperature sensor 30 are converted into digital signals through an intake air-amount signal generator circuit 50 and a water temperature signal generator circuit 60, and then are applied to the calculation circuit 70. Ignition signals produced by the calculation circuit 70 are applied to an ignition current control circuit 80 which controls the supply of primary current to an ignition mechanism 90.

Figure 2B:
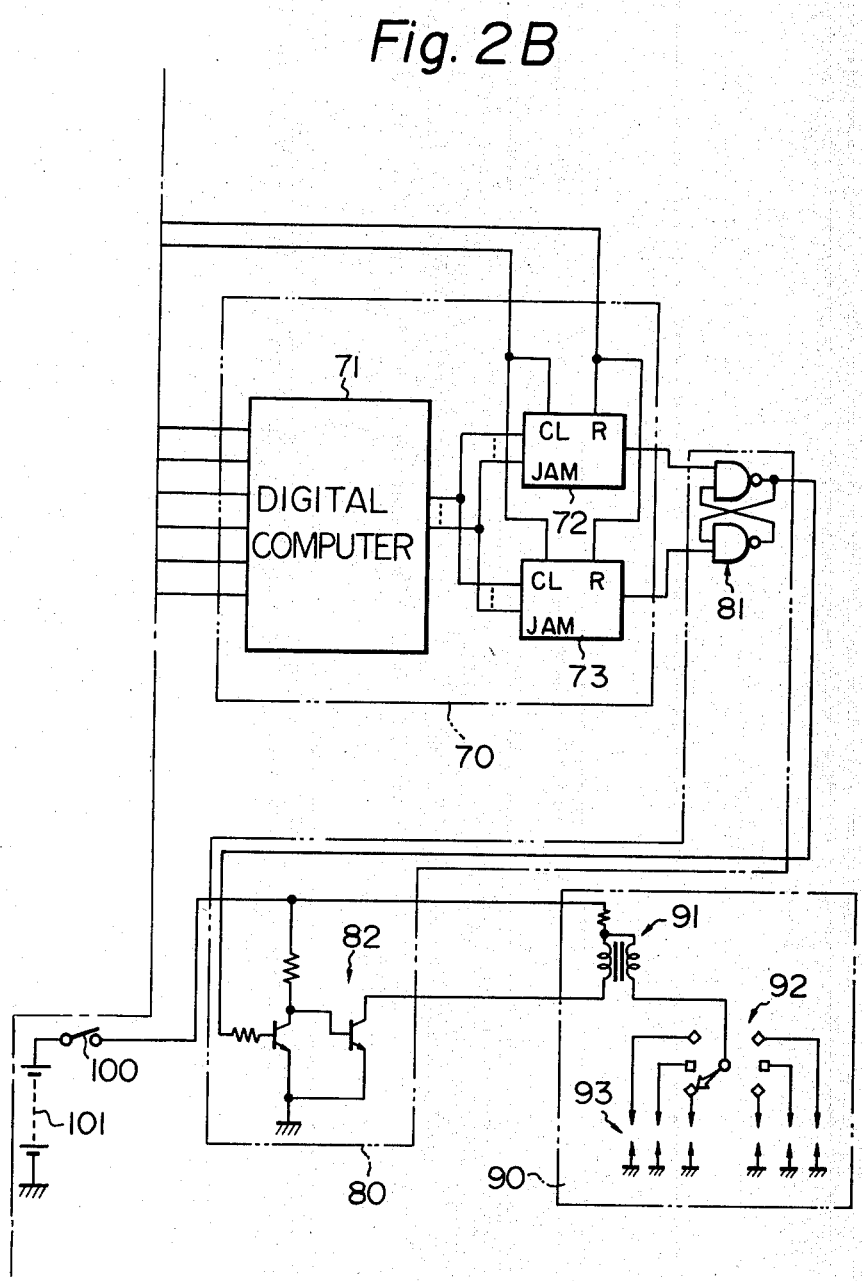

FIG. 2 is a block diagram illustrating the system of FIG. 1 in further detail. Referring to FIG. 2, the rotational speed signal generator circuit 40 comprises a clock signal generator 41, an AND gate 43 which receives clock pulses produced by the generator 41 and reference signals which have a high level while the crankshaft rotates through a predetermined angle $\theta$, and are introduced through an input terminal 42, a binary counter 44 which counts the number of clock pulses introduced through the AND gate 43, a latch circuit 45 which momentarily stores the output of the binary counter 44, and a decade counter 46 which produces decade outputs to control the reset timing of the counter 44 and to control the input of data of the latch circuit 45. The binary counter 44 counts the number of the clock pulses which are introduced thereto while the reference signals are at the high level, i.e., which are introduced thereto while the crank shaft rotates by the predetermined crank angle $\theta_1$, and then the latch circuit 45 stores the counted number of the counter 44 at predetermined crank angles 120° apart. As a result, the engine's rotational speed signal is formed by the generator circuit 40.

The intake air-mounted signal generator circuit 50 comprises an amplifier 52 which amplifies the output of the air-flow sensor 20 introduced thereto via an input terminal 51, an analog-to-digital converter (A/D converter) 53 which converts the amplified analog signals into digital signals, and a latch circuit 54 which momentarily stores the converted digital signals at the predetermined crank angles 120° apart. The intake air-amount signal generator circuit 50 thus provides digital signals that represent the amount of the air sucked into the engine.

The water temperature signal generator circuit 60 comprises an amplifier 62 which amplifies the output of the water-temperature sensor 30 introduced thereto via an input terminal 61, an analog-to-digital converter (A/D converter) 63 which converts the amplified analog signals into digital signals, and a latch circuit 64 which momentarily stores the converted digital signals at the predetermined crank angles 120° apart. The water temperature signal generator circuit 60 produces digital signals that represent the temperature of the coolant in the engine.

The ignition timing calculation circuit 70 comprises a digital computer 71 which contains a microprocessor, random access memory (RAM) (not illustrated), read-only memory (ROM) (not illustrated), a first presettable down-counter 72 which determines a time of stopping the current flowing to the primary winding of the ignition coil, i.e., which determines the ignition timing, and a second presettable down-counter 73 which determines a time of initiating the current flowing to the primary winding. The digital computer 71 calculates an optimum ignition timing, at which the engine can be operated most efficiently, based upon the rotational speed signals and the intake air-amount signals that are produced by the generator circuits 40 and 50. The digital computer 71 then calculates a time period $T_a$ required by the crank shaft for rotating from each predetermined crank angle position to a position corresponding to the calculated optimum ignition timing, and thereafter, the digital computer 71 feeds the down-counter 72 with a digital signal having a value $A_a$ equal to the calculated time period $T_a$ divided by a period of clock pulses applied to the down-counter 72. The digital computer 71 also calculates a time period $T_{off}$ of halting current feeding to the ignition coil primary winding, i.e., a time period from the present ignition timing to a time at which current feeding to the primary winding is initiated to ignite a next cylinder (hereinafter called as an off-current period), by using a well-known method. Thereafter, the computer 71 calculates a time period $T_b$, by adding the previously calculated time period $T_a$ and the calculated off-current period $T_{off}$ and then, feeds the down-counter 73 with a digital signal having a value $A_b$ equal to the calculated time period $T_b$ divided by a period of clock pulses applied to the down-counter 73.

The ignition current control circuit 80 comprises: a flip-flop 81 which is set and reset by outputs fed from the first and second down-counter 72 and 73, respectively, and a driving circuit 82 for on-off controlling current which is fed from a battery 101 via an ignition switch 100 to a primary winding of the ignition coil 91 in the ignition mechanism 90, in accordance with an output from the flip-flop 81.

The ignition mechanism 90 is a well-known mechanism which includes the aforementioned ignition coil 91, a distributor 92 and spark plugs 93.

The operation, especially the operation except for correcting the ignition timing, of the present embodiment will now be described by referring to FIG. 3, FIG. 4 and FIG. 5.

Figure 3:
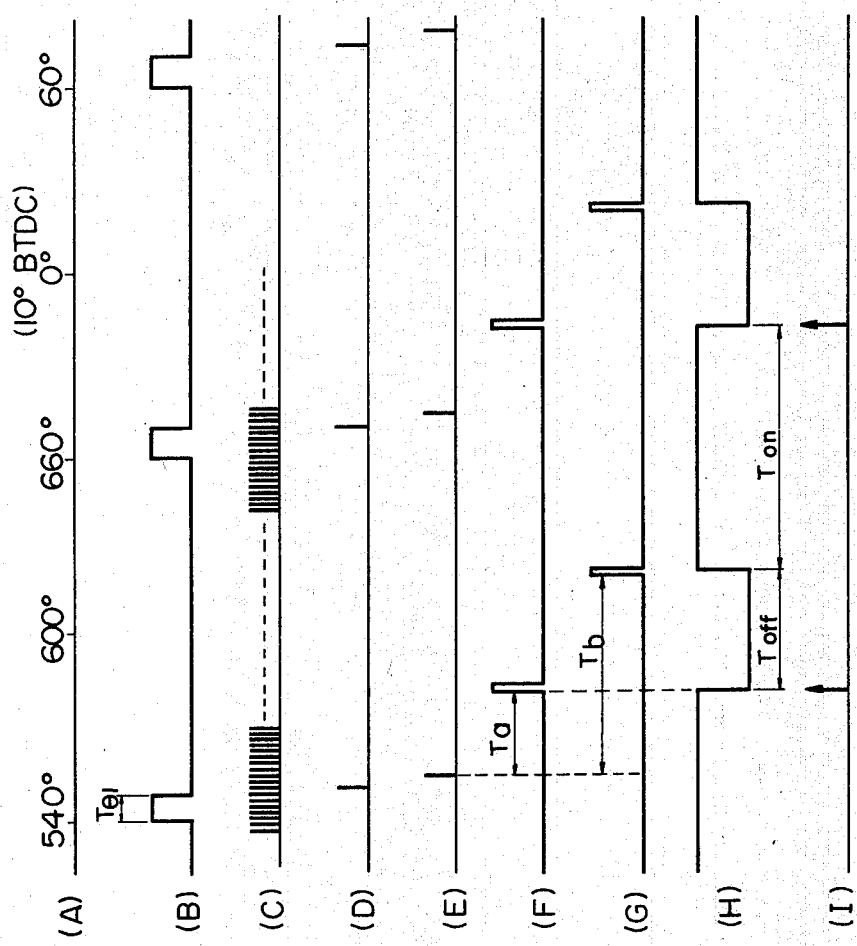
FIG. 3 is a diagram illustrating wave-forms obtained at various points in the ignition control system.

The crank angle position sensor 10 generates a standard pulse signal, as shown in FIG. 3-(B), at every crank angle position of 70° before top dead center (70° BTDC); in other words, at every standard crank angle position which appears at an interval of 120°. The pulse width $T\theta_1$ of this standard pulse signal corresponds to a time period required by the crank shaft for rotating by a crank angle of $\theta_1$. Therefore, this pulse width $T\theta_1$ varies in accordance with the rotational speed of the engine.

FIG. 3-(A) shows crank angles relative to a standard 0° position which corresponds to a position advanced 10° before top dead center of the first cylinder.

As previously mentioned, the crank angle position sensor 10 generates a standard pulse signal having a pulse width of $T\theta_1$ at each crank angle position of 60°, 180°, 300°, 420°, 540° and 660° shown in FIG. 3-(A). The clock signal generator 41 generates pulse signals with an interval of, for example, 12.5 $\mu$sec, as shown in FIG. 3-(C). The binary counter 44 counts the number of the clock pulses passing within a time period corresponding to the pulse width $T\theta_1$ of the standard pulse signal. Therefore, the counted number in the counter 44 is inversely proportional to the rotational speed of the engine.

The decade counter 46 is reset at the negative edge of the standard pulse signal and then counts the number of the above-mentioned clock pulses; so that the decade outputs of the counted number appear at output terminals $Q_1$ to $Q_n$ thereof. FIG. 3-(D) and FIG. 3-(E) show the decade outputs appearing at the output terminals $Q_1$ and $Q_3$, respectively. The output of $Q_1$ is delayed from the negative edge of the standard pulse signal by one period of the clock pulse, and the output of $Q_3$ is delayed from the negative edge by three times as much as a period of the clock pulse. The output of $Q_1$ is used to transfer the counted number in the counter 44 to the latch circuit 45, and the output of $Q_3$ is used to reset the counter 44. Therefore, a new rotational speed signal is stored in the latch circuit 45 every time the standard pulse signal appears. Furthermore, since the output of $Q_1$ is also applied to the respective latch circuits 54 and 64 of the intake air amount signal generator circuit 50 and the water temperature signal generator circuit 60, a new intake air amount signal and a new water temperature signal are stored in the latch circuits 54 and 64, respectively every time the standard pulse signal appears.

The digital computer 71 reads the data from the latch circuits 45, 54 and 64 in accordance with respective control signals and then carries out the calculations of an optimum ignition timing and of an optimum timing for initiating current feeding to the ignition coil primary winding in accordance with a predetermined program.

The calculation of an optimum ignition timing can be accomplished by using various known algorithms. In one of the known algorithms of calculating an ignition timing, an experimentally found function having a specific relationship between an optimum ignition timing $\theta_d$ (spark-advance angle), the intake air amount Ga(Kg/hr), and the rotational speed N (rpm), as illustrated in FIG. 4, is preliminarily stored in the ROM. In the ROM, as a matter of fact, the spark-advance angle $\theta_d$ is stored in the form of a function $\theta_d(N, Ga/N)$ with N and Ga/N as addresses. The computer 71 calculates values of N and Ga/N from the input data 1/N and Ga which are obtained from the latch circuits 45 and 54, and reads out an optimum spark-advance angle $\theta_d$ corresponding to the calculated values of N and Ga/N from the ROM interpolating, if necessary.

The obtained spark-advance angle $\theta_d$ is then corrected from the following equation by using a spark-angle correction value $\theta'$, which value varies in accordance with the warming-up state of the engine and becomes zero at the completely warmed-up condition.

$$\theta_e = \theta_d + \theta'$$

Thereafter, the computer 71 calculates a crank angle $\theta_a$ between the corrected spark-advance angle position and a standard crank angle position from $\theta_a = 70° - \theta_e$. Then the computer 71 converts the calculated crank angle $\theta_a$ into a unit of time. This conversion can be easily carried out by multiplying the crank angle $\theta_a$ by the rotational speed data 1/N. As a result, the aforementioned time period $T_a$, illustrated in FIG. 3-(F), is obtained. Then, as mentioned earlier, a digital signal having the value $A_a$ obtained by deviding the time period $T_a$ by a period of the clock pulses applied to the down-counter 72 is fed to the down-counter 72, whereby the operation for calculating an optimum ignition timing is finished.

The calculated values $A_a$ related to the ignition timing and the value $A_b$ related to the time for initiating current feeding to the ignition coil primary winding are fed to and preset to the down-counters 72 and 73, respectively. The down-counters 72 and 73 start the operation of counting the number of the clock pulses fed from the clock signal generator 41 when the output of $Q_3$ is fed from the decade counter 46, in other words, when the crank shaft rotates to the standard crank angle position. When the counted number reaches a figure equal to the preset value $A_a$ fed from the digital computer 71, the down-counter 72 stops the counting operation and simultaneously generates a pulse signal. That is, as shown in FIG. 3-(F), the down-counter 72 generates a pulse signal at the time a delay occurs by the time period $T_a$ from the standard crank angle position, and the flip-flop 81 is set by this pulse signal. As a result, the driving circuit 82 operates so that primary current fed to the primary winding of the ignition coil 91 is cut off.

Subsequently, when the counted number reaches a figure equal to the preset value $A_b$ fed from the computer 71, the down-counter 73 stops the counting operation and simultaneously generates a pulse signal. That is, as shown in FIG. 3-(G), the down-counter 73 generates a pulse signal at a time delayed by the time period $T_b$ from the standard crank angle position, and the flip-flop 81 is reset by this pulse signal. As a result, the primary current flow is restarted.

When the primary current flow stops, as shown in FIG. 3-(H), a high voltage shown in FIG. 3-(I) is induced in the secondary winding of the ignition coil 91 and fed to the spark plugs 93 via the distributor 92 to cause a spark to jump the sparkplug gap.

Hereinafter, the operation for correcting the ignition timing in accordance with the warming-up state of the engine is illustrated with reference to FIGS. 6 and 7.

Figure 7:
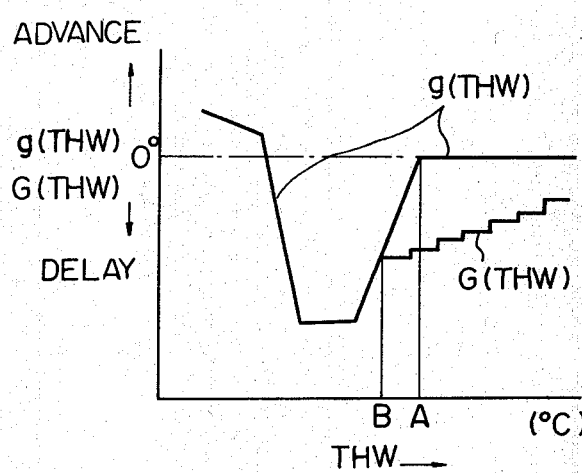
FIGS. 7 and 8 are graphs illustrating functions and effects of the ignition control systems.

According to the present invention, a function describing a relationship between the coolant temperature THW and a first correction value g(THW), as illustrated in FIG. 7, is previously stored in the form of an algebraic function or numerical data in the ROM of the computer 71. As shown in FIG. 7, when the coolant temperature THW is extremely low, the first correction value g(THW) varies to advance the ignition timing in order to compensate for the reduction of the engine output. The first correction value g(THW) then varies to delay the ignition timing in order to purify the exhaust gases and to warm-up the engine when the coolant temperature THW is higher than the above-mentioned extremely low temperature. When the coolant temperature THW is higher than A° C. (for example, 80° C.), the first correction value g(THW) becomes zero.

The computer 71 receives the water temperature signal which indicates the actual coolant temperature THW, via the latch circuit 64, and then, from the above function, it calculates the first correction value g(THW) corresponding to the actual coolant temperature THW. Thereafter, the computer 71 momentarily stores the calculated value of g(THW) into the RAM. According to the embodiment of the present invention, the above calculation of g(THW) is carried out in a main routine.

Figure 6:
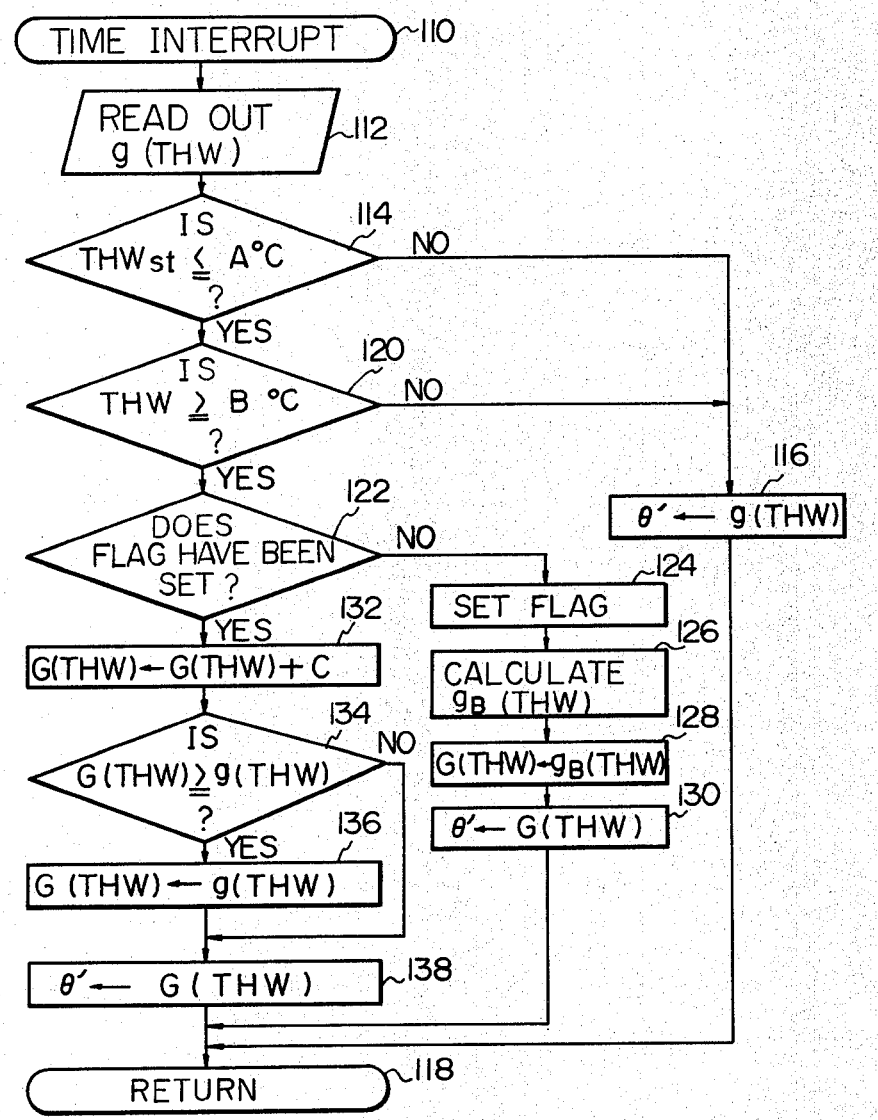
FIG. 6 is a flow chart illustrating the operation of a digital computer in the ignition control system.

The digital computer 71 executes a time interrupt routine illustrated in FIG. 6 for calculating the spark angle correction value at every successive predetermined period of time. At a point 110 of the program shown in FIG. 6, the interrupt operation is executed. Then, at a point 112, the calculated value of g(THW) which has been stored in the RAM is read out. As a next point 114, the computer 71 discriminates whether the coolant temperature when the engine is starting is lower than or equal to a predetermined temperature A° C. or not. The data of coolant temperature THW when the engine is starting is previously stored in the RAM as the starting coolant temperature data $THW_{st}$. If the engine is started again after it has been completely warmed-up, the catalytic converter will have also been warmed-up. The point 114, therefore, is provided to bypass the following processing routine under the warm starting condition.

If $THW_{st} > A$, the program proceeds to a point 116, where the spark angle correction value $\theta'$ is determined as $\theta' \leftarrow g(THW)$; then the program returns to the main routine at a point 118.

At the point 114, if the computer determines that $THW_{st} \leq A$, the program proceeds to a point 120 where the magnitude of the present coolant temperature THW and a predetermined temperature B° C. are compared. This predetermined temperature B° C. will usually lie within 40° C. to 60° C. If THW < B° C., the program proceeds to the point 116 where the spark angle correction value $\theta'$ is selected equal to the first correction value g(THW). If THW $\geq$ B° C., on the other hand, the program proceeds to the routine after a point 122, whereby the spark angle correction value $\theta'$ is selected equal to a second correction value G(THW).

At the point 122, the computer discriminates whether the second correction value G(THW) is set to an initial value by monitoring whether an initial flag has been set or not. If the program has proceeded to the point 122 for the first time after starting the engine, the initial flag is not yet set. Therefore, the program proceeds to a point 124 to set the initial flag. Then, at a point 126, the computer reads out from the ROM a specific first correction value $g_B(THW)$ which is the first correction value g(THW) when the coolant temperature THW is equal to the temperature of B° C. At a point 128, thereafter, the initial value of G(THW) is set as G(THW)←$g_B$(THW). At a next point 130, the spark angle correction value θ' is made equal to the initial value of G(THW), then at point 118 the program returns to the main routine.

In the subsequent time interrupt routine, since the initial flag is set, the program is allowed to proceed from point 122 to point 132 where the second correction value G(THW) is advanced stepwise by a predetermined value C. Namely, the correction value for delaying the spark angle is reduced by a predetermined value C. Then, at points 134 and 136 the computer ensures that the second correction value G(THW) will not exceed the first correction value g(THW); then the program proceeds to point 138. At point 138, the computer sets the spark angle correction value θ' to be equal to the second correction value G(THW) obtained at points 132 or 136. The program then returns to the main routine. As the processings in points 132 to 138 are repetitively carried out by the time interrupt for every predetermined period of time, the second correction value G(THW) gradually approaches zero as shown in FIG. 7.

Thus, according to this embodiment of the present invention, when the coolant temperature THW at starting is lower than B° C. or higher than A° C., the spark angle correction value θ' maintains the characteristics of g(THW) shown in FIG. 7. When the coolant temperature THW after starting exceeds B° C. but is less than or equal to A° C., the spark angle correction value θ' gradually approaches zero over a period of time from the moment at which the coolant temperature THW first exceeds irrespective of the coolant temperature. In other words, the correction value for delaying the spark angle gradually decreases.

Figure 8:
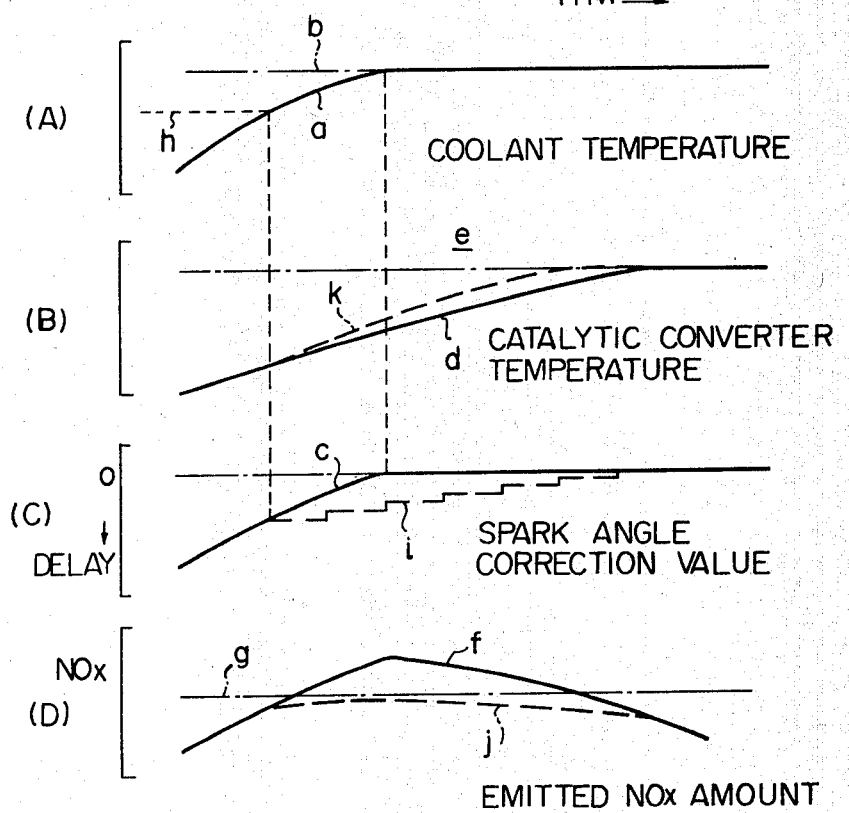

FIG. 8 is a diagram for illustrating the functions and effects of the above-mentioned embodiment, in which the abscissa represents the lapse of time after the engine is started under cold condition, and the ordinate represents (A) temperature of the coolant, (B) temperature of the catalytic converter, (C) spark angle correction value, and (D) amount of NOx components that are emitted. Referring to FIGS. 8-(A) and 8-(C), according to the conventional method, the spark angle correction value c which had been deviated in the delay side becomes zero at a moment when the temperature a of the coolant temperature reaches the temperature b at which the warming-up of the engine is regarded to be completed. At this moment, however, the temperature d of the catalytic converter has not yet reached the active temperature region e as shown in FIG. 8-(B). As shown in FIG. 8-(D), therefore, the NOx components tend to be emitted in amounts considerably greater than the allowable value g as indicated by f.

According to the method of the embodiment of the present invention, on the contrary, the spark retard angle correction value gradually decreases to zero over a period of time quite irrespective of the temperature a of the cooling water, after the temperature of the cooling water has reached a predetermined value h, as shown by i in FIG. 8-(C). Consequently, the amounts of NOx components emitted are restrained to be smaller than the allowable value g even when the temperature of the catalytic converter is lower than the active temperature region, as indicated by j in FIG. 8-(D). Furthermore, since the ignition timing is controlled to be delayed, as indicated by i in FIG. 8-(C), the warming-up of the catalytic converter can be promoted, as shown by k in FIG. 8-(B). Although FIG. 8-(D) deals only with the emission of NOx components, the emission of HC components can of course be reduced as well.

In controlling the ignition timing according to the present invention, the reduction of the spark angle correction value with respect to time can be carried out not only by the time interrupt routine which is executed at every predetermined period of time, but also by a timer means which is commanded by the main routine. Furthermore, the present invention can be achieved by using any other electronic circuit such as an analog circuit instead of using the digital computer.

In the above-described embodiment, the arithmetic calculation with respect to ignition timing was effected based upon a unit of time or a unit of crank angle as fundamental units, and the units were finally converted into a number of clock pulses as counted by the down-counters. The arithmetic calculation, however, may be carried out based upon counted number of the clock pulses as fundamental units, or by utilizing pulses which are produced at every predetermined crank angle as counting pulses for the down-counter. Moreover, any other conventionally known methods can be employed for calculating the ignition timing when the engine is completely warmed-up or for calculating the timing for initiating the current feeding to the ignition coil.

According to the method of controlling ignition timing of the present invention as illustrated in detail in the foregoing, the ignition timing correction value is gradually reduced to zero with the lapse of time irrespective of the temperature of the coolant after the temperature of the coolant has exceeded a predetermined value. Therefore, the emission of NOx and HC components can be effectively reduced even when the catalytic converter is not yet sufficiently warmed-up. Moreover, the warming-up of the catalytic converter can be promoted.

As many widely different embodiments of the present invention may be constructed without departing from the spirit and scope of the present invention, it should be understood that the present invention is not limited to the specific embodiments described in this specification, except as defined in the appended claims.

Figure 4:
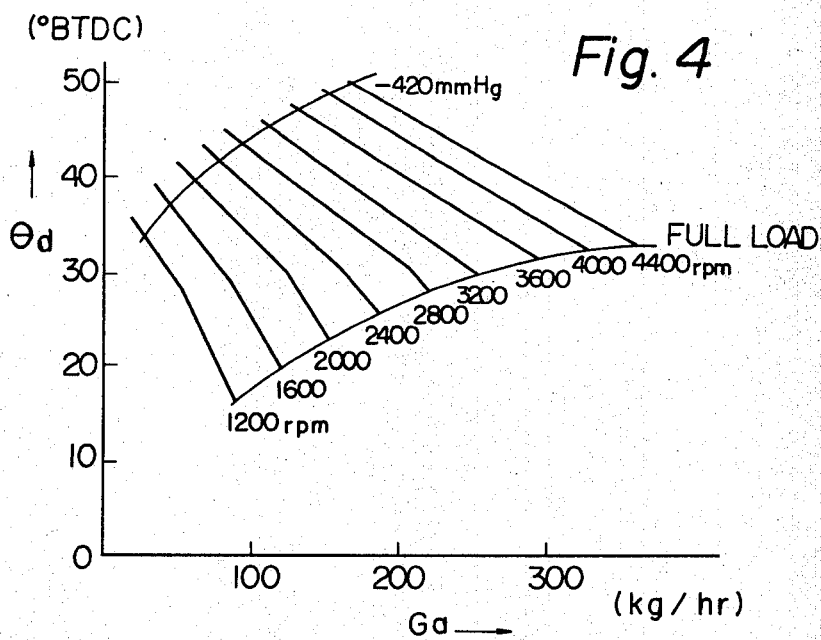
FIG. 4 is a graph of a spark-advance angle $\theta_d$ versus intake air amount Ga and rotational speed N.
Figure 5:
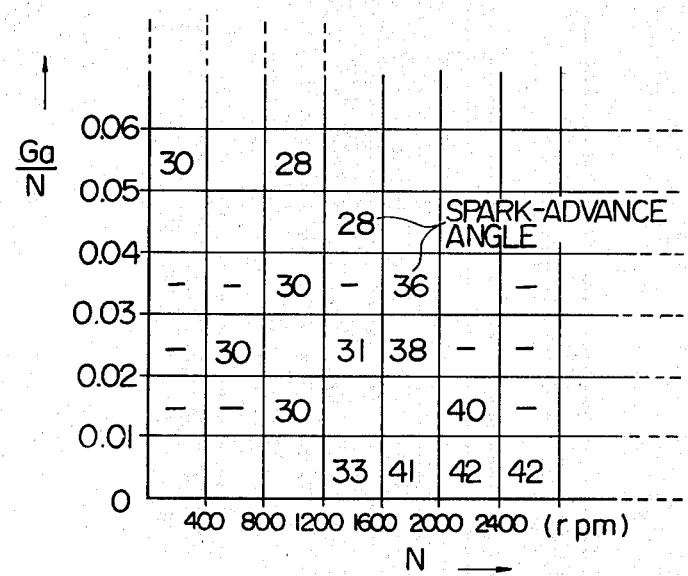
FIG. 5 illustrates a store map of the spark-advance angle $\theta_d$ with respect to N and Ga/N.

I claim:

1. A method of controlling the ignition timing of an internal combustion engine after startup, comprising the steps of:

detecting the coolant temperature of the engine and producing an electrical signal indicative of said detected coolant temperature;

calculating an ignition timing correction value from said produced temperature signal, by using a function describing a desired relationship between the coolant temperature and the ignition timing correction value, when the detected coolant temperature is lower than or equal to a first predetermined temperature which is lower than a second coolant temperature of the completely warmed-up engine;

after the detected coolant temperature exceeds said first predetermined value, reducing the ignition timing correction value gradually over a period of time to zero from the value calculated by the above calculating step when the detected coolant temperature is equal to said predetermined value; and retarding the ignition timing of the engine in accordance with said ignition timing correction value.

trated in FIG. 4, is preliminarily stored in the ROM. In the ROM, as a matter of fact, the spark-advance angle $\theta_d$ is stored in the form of a function $\theta_d(N, Ga/N)$ with N and Ga/N as addresses. The computer 71 calculates values of N and Ga/N from the input data 1/N and Ga which are obtained from the latch circuits 45 and 54, and reads out an optimum spark-advance angle $\theta_d$ corresponding to the calculated values of N and Ga/N from the ROM interpolating, if necessary.

The obtained spark-advance angle $\theta_d$ is then corrected from the following equation by using a spark-angle correction value $\theta'$, which value varies in accordance with the warming-up state of the engine and becomes zero at the completely warmed-up condition.

$$\theta_e = \theta_d + \theta'$$

Thereafter, the computer 71 calculates a crank angle $\theta_a$ between the corrected spark-advance angle position and a standard crank angle position from $\theta_a = 70° - \theta_e$. Then the computer 71 converts the calculated crank angle $\theta_a$ into a unit of time. This conversion can be easily carried out by multiplying the crank angle $\theta_a$ by the rotational speed data 1/N. As a result, the aforementioned time period $T_a$, illustrated in FIG. 3-(F), is obtained. Then, as mentioned earlier, a digital signal having the value $A_a$ obtained by deviding the time period $T_a$ by a period of the clock pulses applied to the down-counter 72 is fed to the down-counter 72, whereby the operation for calculating an optimum ignition timing is finished.

The calculated values $A_a$ related to the ignition timing and the value $A_b$ related to the time for initiating current feeding to the ignition coil primary winding are fed to and preset to the down-counters 72 and 73, respectively. The down-counters 72 and 73 start the operation of counting the number of the clock pulses fed from the clock signal generator 41 when the output of $Q_3$ is fed from the decade counter 46, in other words, when the crank shaft rotates to the standard crank angle position. When the counted number reaches a figure equal to the preset value $A_a$ fed from the digital computer 71, the down-counter 72 stops the counting operation and simultaneously generates a pulse signal. That is, as shown in FIG. 3-(F), the down-counter 72 generates a pulse signal at the time a delay occurs by the time period $T_a$ from the standard crank angle position, and the flip-flop 81 is set by this pulse signal. As a result, the driving circuit 82 operates so that primary current fed to the primary winding of the ignition coil 91 is cut off.

Subsequently, when the counted number reaches a figure equal to the preset value $A_b$ fed from the computer 71, the down-counter 73 stops the counting operation and simultaneously generates a pulse signal. That is, as shown in FIG. 3-(G), the down-counter 73 generates a pulse signal at a time delayed by the time period $T_b$ from the standard crank angle position, and the flip-flop 81 is reset by this pulse signal. As a result, the primary current flow is restarted.

When the primary current flow stops, as shown in FIG. 3-(H), a high voltage shown in FIG. 3-(I) is induced in the secondary winding of the ignition coil 91 and fed to the spark plugs 93 via the distributor 92 to cause a spark to jump the sparkplug gap.

Hereinafter, the operation for correcting the ignition timing in accordance with the warming-up state of the engine is illustrated with reference to FIGS. 6 and 7.

According to the present invention, a function describing a relationship between the coolant temperature THW and a first correction value g(THW), as illustrated in FIG. 7, is previously stored in the form of an algebraic function or numerical data in the ROM of the computer 71. As shown in FIG. 7, when the coolant temperature THW is extremely low, the first correction value g(THW) varies to advance the ignition timing in order to compensate for the reduction of the engine output. The first correction value g(THW) then varies to delay the ignition timing in order to purify the exhaust gases and to warm-up the engine when the coolant temperature THW is higher than the above-mentioned extremely low temperature. When the coolant temperature THW is higher than A° C. (for example, 80° C.), the first correction value g(THW) becomes zero.

The computer 71 receives the water temperature signal which indicates the actual coolant temperature THW, via the latch circuit 64, and then, from the above function, it calculates the first correction value g(THW) corresponding to the actual coolant temperature THW. Thereafter, the computer 71 momentarily stores the calculated value of g(THW) into the RAM. According to the embodiment of the present invention, the above calculation of g(THW) is carried out in a main routine.

The digital computer 71 executes a time interrupt routine illustrated in FIG. 6 for calculating the spark angle correction value at every successive predetermined period of time. At a point 110 of the program shown in FIG. 6, the interrupt operation is executed. Then, at a point 112, the calculated value of g(THW) which has been stored in the RAM is read out. As a next point 114, the computer 71 discriminates whether the coolant temperature when the engine is starting is lower than or equal to a predetermined temperature A° C. or not. The data of coolant temperature THW when the engine is starting is previously stored in the RAM as the starting coolant temperature data $THW_{st}$. If the engine is started again after it has been completely warmed-up, the catalytic converter will have also been warmed-up. The point 114, therefore, is provided to bypass the following processing routine under the warm starting condition.

If $THW_{st} > A$, the program proceeds to a point 116, where the spark angle correction value $\theta'$ is determined as $\theta' \leftarrow g(THW)$; then the program returns to the main routine at a point 118.

At the point 114, if the computer determines that $THW_{st} \leq A$, the program proceeds to a point 120 where the magnitude of the present coolant temperature THW and a predetermined temperature B° C. are compared. This predetermined temperature B° C. will usually lie within 40° C. to 60° C. If THW < B° C., the program proceeds to the point 116 where the spark angle correction value $\theta'$ is selected equal to the first correction value g(THW). If THW $\geq$ B° C., on the other hand, the program proceeds to the routine after a point 122, whereby the spark angle correction value $\theta'$ is selected equal to a second correction value G(THW).

At the point 122, the computer discriminates whether the second correction value G(THW) is set to an initial value by monitoring whether an initial flag has been set or not. If the program has proceeded to the point 122 for the first time after starting the engine, the initial flag is not yet set. Therefore, the program proceeds to a point 124 to set the initial flag. Then, at a point 126, the computer reads out from the ROM a specific first correction value $g_B(THW)$ which is the first correction